W. B. CULVER.
VALVE.
APPLICATION FILED JUNE 28, 1906.
922,265.
Patented May 18, 1909.
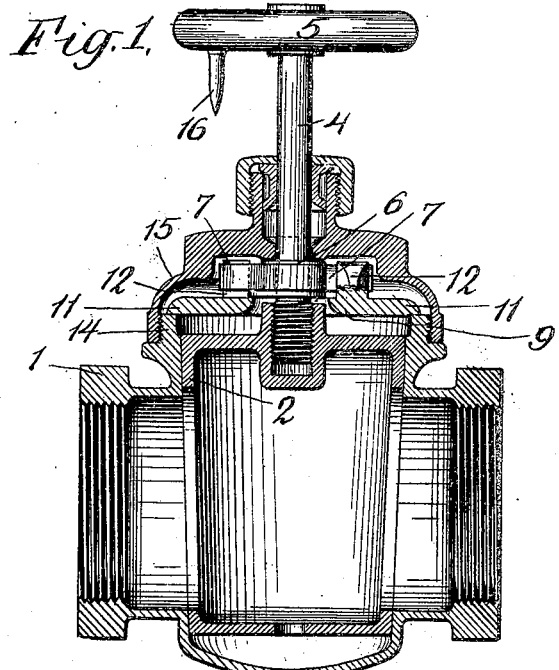
Fig. 1.
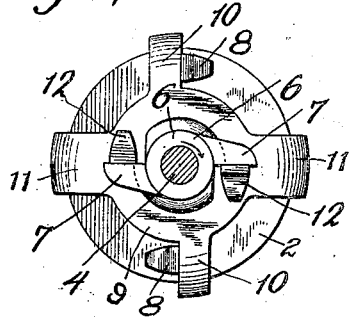
Fig. 2.
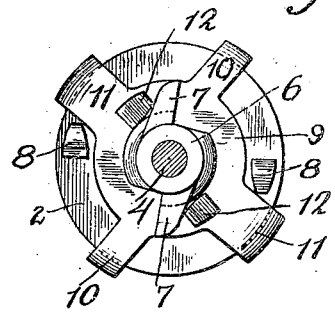
Fig. 3.
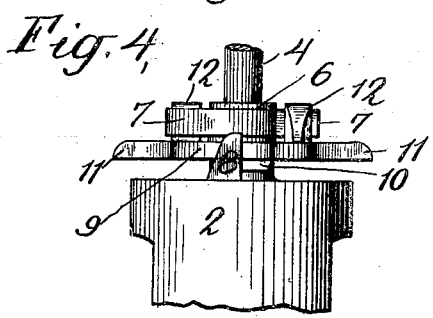
Fig. 4.
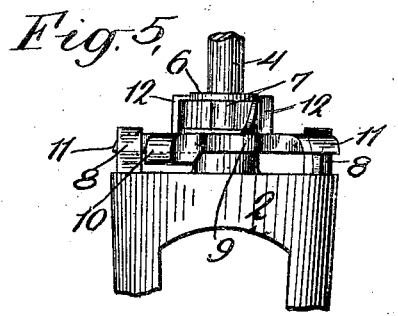
Fig. 5.
WITNESSES:
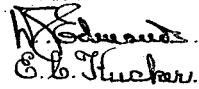
INVENTOR
Willard B. Culver
BY
ATTORNEY

UNITED STATES PATENT OFFICE.

WILLARD B. CULVER, OF CARBONDALE, PENNSYLVANIA.

VALVE.

No. 922,265.  Specification of Letters Patent.  Patented May 18, 1909.

Application filed June 28, 1906. Serial No. 323,939.

*To all whom it may concern:*

Be it known that I, WILLARD B. CULVER, a citizen of the United States, residing at Carbondale, in the county of Lackawanna and State of Pennsylvania, have invented a certain new and useful Improvement in Valves, of which the following is a specification.

This invention relates to valves or cocks for controlling the flow of fluids in pipes or conduits, and refers more particularly to valves so constructed that their movable members may be locked in any desired positions, as for instance in the positions in which they permit or preclude the flow of fluid through the conduit.

The field of utility of the principles of my invention is in no way limited since they are applicable generally to valves for various and widely different uses; as an example, they may be employed to advantage in valves connected in the piping of a water or steam system.

The object of my invention is to provide a valve or cock which possesses the requisite strength, which is of simple and inexpensive construction, and whose movable member can be readily locked in any desired position. I accomplish these ends by so arranging the movable member of the valve that it can be rotated on its axis to open or close the connection through the valve and also can be moved axially a short distance to lock it against further rotational movement. For this purpose the movable valve-member and the seat therefor are preferably tapered somewhat so that the axial movement of the member jams it against its seat to hold it in position until moved back again axially to its normal position. The preferred method of obtaining these two movements of the movable valve-member, and one which is very simple and effective, is by connecting the operating handle thereto in such a manner that movement of the handle in one direction effects the rotational movement of the member to open and close the valve and movement of the handle in the reverse direction effects the axial movement which serves to lock the member. For this purpose the operating handle may be loosely connected to the valve-member in any suitable manner and one or more loose links or clutch elements may be provided between the handle and member so that, when the handle has been turned in one direction, actuating the valve-member by reason of the coaction of these links, it may be turned in the reverse direction without actuating the member; and provision may be made such that this reverse movement operates to jam the parts and thus lock the valve-member against further movement. With a valve so constructed, an indicator mechanism may be combined by which the operator can tell at a glance the position in which the movable valve-member lies.

I have illustrated one embodiment of my invention in the accompanying drawings, in which—

Figure 1 is a sectional elevation of a valve, Figs. 2 and 3 are top views of the connecting links and the movable valve-member showing two positions thereof, and Figs. 4 and 5 are side elevations of the parts as shown in Figs. 2 and 3 respectively.

Referring to these drawings, 1 indicates the valve casing having an opening therethrough, the ends of which are threaded to facilitate connection of the valve in a system of piping. The casing 1 is formed to provide a seat for the movable valve-member 2, this seat consisting of Babbitt metal if desired. The member 2 is hollow and is provided with openings on opposite sides to aline with the opening through the casing 1. Member 2 and the seat therefor are so constructed that when the member is moved axially downward it will jam against the walls of the seat, as by correspondingly tapering the member and seat. In the upper end of the member 2 is a socket to receive the end of a stem 4, the connection being made by threading the parts, and on the other end of stem 4 is secured an operating handle 5.

Rigidly secured upon the stem 4 is a collar 6 having two projections 7, 7, formed on opposite sides thereof, and on the top of the valve-member 2 are two integral projections 8, 8; between the projections 7, 7 and 8, 8 are one or more clutch-rings by which the stem 4 and handle 5 are connected in operative relation to the valve-member 2 and which permit of a certain amount of reverse movement of stem 4 independently of member 2. Preferably only one of these clutch-rings is employed; this is a ring 9 having projections 10, 10, extending radially outward in opposite directions and adapted when the ring is turned to engage the projections 8, 8 and cause member 2 to turn with ring 9. Ring 9 may also have two additional radial projections 11, 11, the ends of all four of these projections extending over a flange 14 on the upper edge of the casing 1 to sustain the ring in position. Ring 9 also has two upwardly extending projections 12, 12, adapted to be engaged by the projections 7, 7 on collar 6.

On the casing 1 is a flange 14 threaded to receive a correspondingly threaded flange on a cap 15 which incloses the clutch-rings and is provided with a central opening through which stem 4 extends. The under side of cap 15 directly overlies the top of collar 6, though, if desired, a washer may be inserted between them.

As thus constructed it will be seen that rotation of the handle 5 in the direction indicated by the arrow in Fig. 2 causes the parts to assume the positions illustrated in Figs. 2 and 4. Collar 6 turns with stem 4 and the projections 7 thereon engage the projections 12 on ring 9; the projections 10 on the latter engage the projections 8 on valve-member 2, so that movement of the handle 5 in this direction effects a corresponding movement of member 2 and the latter can thus be brought to the position shown in Fig. 1 in which the passageway through the valve is unimpeded or to a position ninety degrees displaced therefrom in which the valve is closed. If it is desired to lock the valve-member in any adjusted position, the handle 5 is turned in the reverse direction. This carries collar 6 around until each of the projections 7 thereon engages the other one of the projections 12 and then turns ring 9 with collar 6, thus carrying projections 10 away from projections 8 on valve-member 2 as shown in Fig. 3. During this backward movement of the stem, the valve-member 2 does not rotate and on account of the threaded connection between them they are moved one relatively to the other. But the engagement of the top of collar 6 with the under side of cap 15 prevents upward movement of stem 4 and therefore the movable valve-member is forced downward until it becomes jammed in its seat and is held against movement.

If an indicator is desired to show the position of the movable valve-member, an index 16 may be secured on handle 5 or stem 4, extending toward the top of cap 15. The size and shape of the parts of the locking mechanism may be such that when the valve-member has been moved by handle 5 to the desired position, a half revolution of the handle in the opposite direction effects the locking of the parts and cap 15 need therefore be provided with only four marks symmetrically disposed about the stem 4, two opposite marks, suitably labeled if desired, indicating the open position and the other two the closed position.

Having now described my invention, what I claim as new therein and desire to secure by Letters Patent is as follows:—

1. A valve comprising a casing, a movable valve-member mounted therein, a handle loosely connected to said member, means actuated by the handle when turned in one direction for positively connecting the handle to said member and for rotating the member, and means actuated by the handle when turned in the opposite direction for locking said member against rotation, substantially as set forth.

2. A valve comprising a casing, a movable valve-member mounted therein, coöperating tapered surfaces on the casing and member, a handle loosely connected to the member, means operated by the handle when turned in one direction for positively connecting the handle to said member for rotating said member, and means actuated by the handle when turned in the opposite direction for moving said member bodily to cause hard engagement of said surfaces, substantially as set forth.

3. A valve comprising a casing, a valve-member mounted therein and adapted to rotate and to move axially, said casing and valve-member having coöperating tapered surfaces thereon, an operating handle, and a member lying loosely between the handle and valve-member and adapted to connect the former in driving relation to the latter, said member permitting reverse movement of the handle without rotating the valve-member, substantially as set forth.

4. A valve comprising a casing, a valve-member rotatable and movable axially therein, said casing and valve-member having coöperating tapered surfaces thereon, a stem connected to the valve-member, a part rigidly secured to the stem and having projections, projections on the movable valve-member, and a part lying loosely between said projections and adapted to connect them, substantially as set forth.

5. A valve comprising a casing, a valve-member rotatable and movable axially therein, coöperating tapered surfaces on the casing and member, a stem having a threaded connection with said member but movable independently thereof, and a member lying loosely between the handle and valve-member and adapted to connect the former in driving relation to the latter, said member permitting reverse movement of the handle without rotating the valve-member, substantially as set forth.

6. A valve comprising a casing, a movable valve-member mounted therein, a handle connected to said member, a member lying loosely between the handle and valve-member and actuated by the handle when turned in one direction for rotating said valve-member, means actuated by the handle when turned in the opposite direction for locking said valve-member against rotation, and means for indicating the position of the movable valve-member, substantially as set forth.

7. A valve comprising a casing, a valve-member rotatable and movable axially therein, said casing and member having coöperating tapered surfaces thereon, a stem having a threaded connection with said member but movable independently thereof, a member lying loosely between said stem and valve-member for causing said valve-member to move with said stem when the latter is turned in one direction, and means for preventing axial movement of the stem when turned in the opposite direction independently of said valve-member, substantially as set forth.

This specification signed and witnessed this 26th day of June, 1906.

WILLARD B. CULVER.

Witnesses:
E. D. YARRINGTON,
J. R. VANDERFORD.